(12) United States Patent
Lee (10) Patent No.: US 11,932,318 B2
(45) Date of Patent: Mar. 19, 2024

(54) RAM AIR TAIL CONE APPARATUS AND METHOD OF USE THEREOF

(71) Applicant: W. Davis Lee, Rockport, ME (US)

(72) Inventor: W. Davis Lee, Rockport, ME (US)

( * ) Notice: Subject to any disclaimer, the term of this patent is extended or adjusted under 35 U.S.C. 154(b) by 0 days.

(21) Appl. No.: 17/899,524

(22) Filed: Aug. 30, 2022

(65) Prior Publication Data

US 2023/0061010 A1    Mar. 2, 2023

Related U.S. Application Data

(60) Provisional application No. 63/239,936, filed on Sep. 1, 2021.

(51) Int. Cl.
*B62D 35/00* (2006.01)

(52) U.S. Cl.
CPC .................................. *B62D 35/004* (2013.01)

(58) Field of Classification Search
CPC ..................................................... B62D 35/004
See application file for complete search history.

(56) References Cited

U.S. PATENT DOCUMENTS

| | | | | |
|---|---|---|---|---|
| 2,737,411 A | * | 3/1956 | Potter | B62D 35/004 267/272 |
| 7,726,724 B2 | * | 6/2010 | Kohls | B62D 35/001 296/180.1 |
| 8,272,425 B2 | * | 9/2012 | Coenraets | E06B 9/58 160/133 |
| 8,287,030 B2 | * | 10/2012 | Ryan | B62D 35/004 296/180.4 |
| 9,371,097 B1 | * | 6/2016 | Conny | B62D 35/004 |
| 9,527,534 B2 | * | 12/2016 | Knobloch | B62D 35/001 |

* cited by examiner

*Primary Examiner* — Joseph D. Pape
(74) *Attorney, Agent, or Firm* — Kevin H. Hazen; Hazen Patent Group, LLC (57) ABSTRACT

The invention comprises a method and apparatus for increasing fuel efficiency of a vehicle moving through air, comprising the steps of: carrying, by the vehicle, a tail cone in an undeployed state; deploying the tail cone on a back of the vehicle while the vehicle is in motion, the tail cone comprising a flexible material; and pressurizing, with the air, an interior space at least partially enclosed by the tail cone, the tail cone forming an aerodynamic feature extending at least fifteen inches behind the vehicle, where pressurizing transforms the tail cone from a flexible material to a static and compliant aerodynamic feature, which increases miles per gallon of the vehicle by at least ten percent at speeds in excess of fifty miles an hour through a reduction in drag force on the vehicle.

16 Claims, 10 Drawing Sheets

RAM AIR TAIL CONE APPARATUS AND METHOD OF USE THEREOF

CROSS REFERENCES TO RELATED APPLICATIONS

This application claims the benefit of U.S. provisional patent application No. 63/239,936, filed Sep. 1, 2021, all of which is incorporated herein in its entirety by this reference thereto.

BACKGROUND OF THE INVENTION

Field of the Invention

The invention relates generally to vehicular fuel efficiency.

Discussion of the Prior Art

Problem

There exists in the art a need for additional fuel efficiency for a vehicle, such as a semi-truck.

SUMMARY OF THE INVENTION

The invention comprises a semi-truck tail cone apparatus and method of use thereof.

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a method and apparatus for increasing fuel efficiency of a vehicle moving through air, comprising the steps of: carrying, by the vehicle, a tail cone in an undeployed state; deploying the tail cone on a back of the vehicle while the vehicle is in motion, the tail cone comprising a flexible material; and pressurizing, with the air, an interior space at least partially enclosed by the tail cone, the tail cone forming an aerodynamic feature extending at least fifteen inches behind the vehicle, where pressurizing transforms the tail cone from a flexible material to a static and compliant aerodynamic feature, which increases miles per gallon of the vehicle by at least ten percent at speeds in excess of fifty miles an hour through a reduction in drag force on the vehicle.

Herein, a z-axis is aligned with gravity and an x/y-plane is perpendicular to the z-axis, such as a road surface. In most cases, an x-axis is in the direction of travel of a vehicle, a y-axis is across the vehicle, and a z-axis measures a height of the vehicle.

Fuel Efficiency

Reducing a drag coefficient on a vehicle results in fuel savings via an increased vehicle miles per gallon rating. An increased miles per gallon rating additionally corresponds to a reduction in fuel expense and a reduction in carbon dioxide emissions.

Tail Cone

Figure 1:
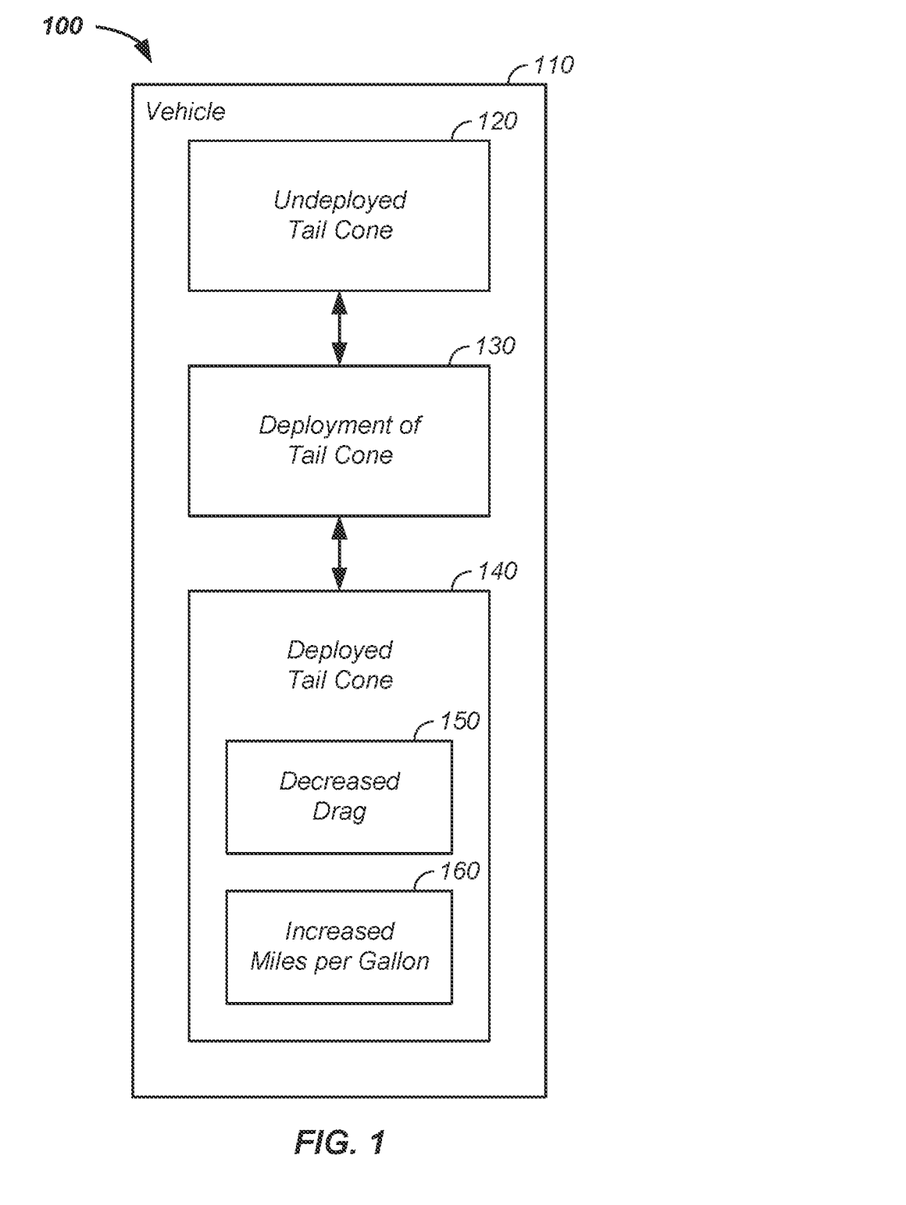
FIG. 1 illustrates a tail cone deployment system.

Referring now to FIG. 1, a fuel saving system 100 is illustrated. Generally, a vehicle 110 is made more fuel efficient through expansion and retraction of a tail cone behind the vehicle, such as at speeds in excess of 20, 30, or 40 miles per hour. Generally, an undeployed tail cone 120 is carried by the vehicle 110. The tail cone undergoes a process of deployment 130, such as in response to a command and/or is automatically deployed, as further described infra. A resulting deployed tail cone 140 decreases drag 150 and/or increases miles per gallon 160 of travel of the vehicle 110. Tail cone shape, deployment, drag reduction, and tail cone recovery are all further described infra.

Figure 2:
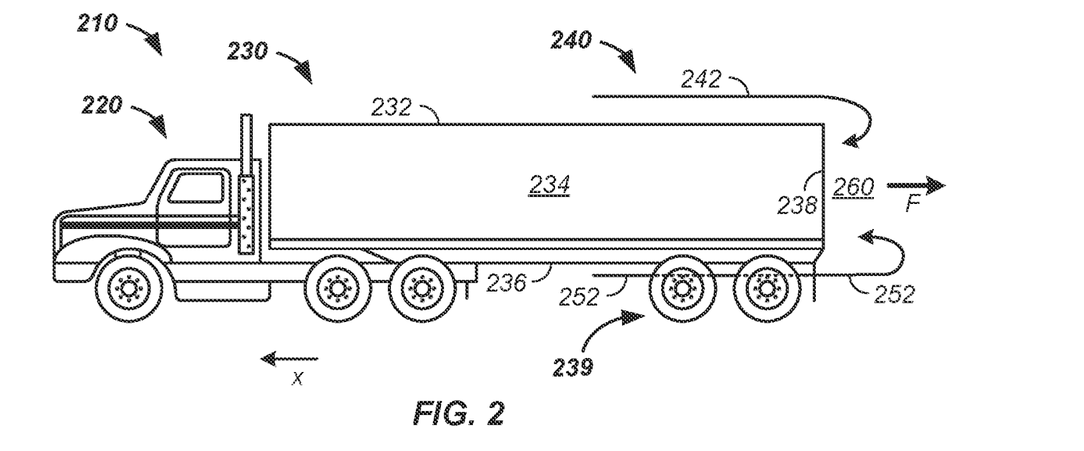
FIG. 2 illustrates a semi-truck.

Referring now to FIG. 2, the vehicle 110 is further described. For clarity of presentation and without loss of generality, a semi-truck 210 is used to describe the vehicle 110 and deployment/recovery of the tail cone. Herein, a semi-truck or semitruck is optionally referred to as a semi-trailer truck, semi, eighteen-wheeler, and/or a big rig, which is a combination of a tractor unit and one or more semi-trailers, such as to carry freight. Optionally, the vehicle is any wheeled mode of powered transport, such as a car.

EXAMPLE I

Still referring to FIG. 1, the semi-truck 210 or truck is further described in terms of drag force. The semi-truck 210 generally includes a cab 220 and a trailer 230. Optionally, the cab 220 and trailer 230 are unified, such as in a smaller box truck. The semi-truck 210 includes a top 232, a side 234, a bottom 236, and a back 238 along with a set of tires 239. As illustrated, the semi-truck 210 is moving along the x-axis. As a result of movement of the semi-truck 210 and/or as a result of a headwind or cross-wind, airflow 240 past the truck occurs. As illustrated, a first air-flow 242 occurs along the top of the truck 232, a second air flow 252 occurs along the bottom of the truck 236, and a third air flow, not illustrated for clarity of presentation, occurs along the sides 234 of the trunk. As the semi-truck 210 moves down the road, a partial vacuum 260 results behind the semi-truck 210. The partial vacuum 260 results in a force, F, which essentially acts against forward movement of the semi-truck 210. The force, or drag force, is related to drag coefficient, density of the air, velocity, and cross-sectional area as seen in equation 1, solved for drag force, and equation 2, solved for drag coefficient, $$F_d = \frac{1}{2} c_d \rho \mu^2 A \quad \text{(eq. 1)}$$

$$c_d = \frac{2 F_d}{\rho \mu^2 A} \quad \text{(eq. 2)}$$

where $c_d$ is a drag coefficient, $F_d$ is a drag force, $\rho$ is density, $\mu$ is velocity, and A is a reference area. As further discussed, infra, the drag coefficient is reduced by thirty percent with deployment of the tail cone behind a semi-truck 210. Amongst other things, the tail cone decreases the area, which reduces the drag force and alters the density of the air behind the semi-truck 210.

Figure 3A:
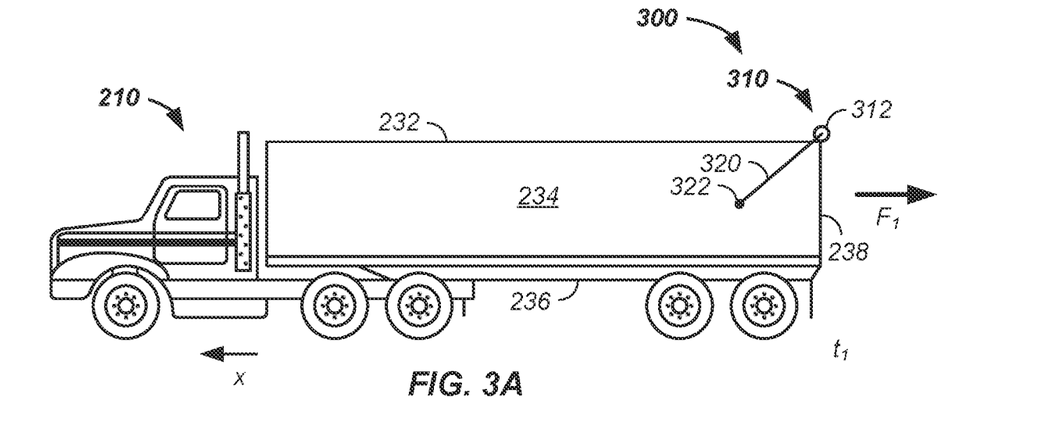
FIG. 3A, FIG. 3B, and FIG. 3C illustrate tail cone deployment at a first, second, and third time, respectively.
Figure 3B:
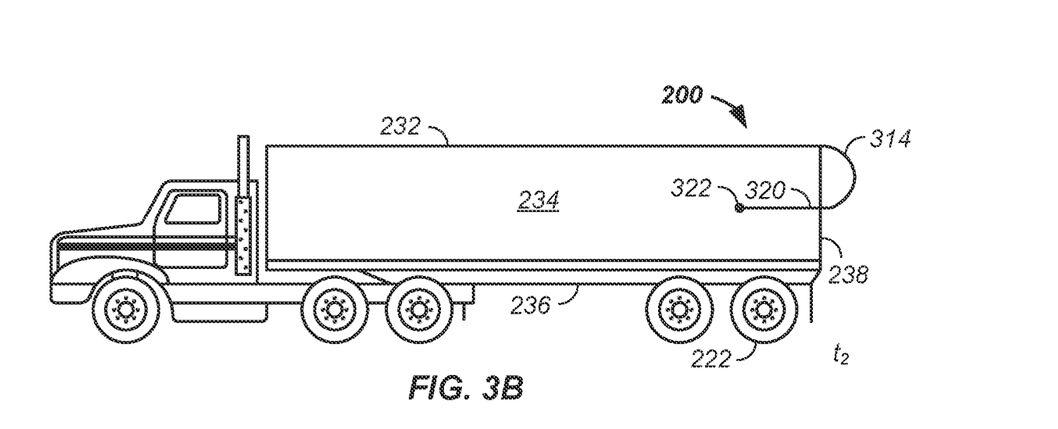
Figure 3C:
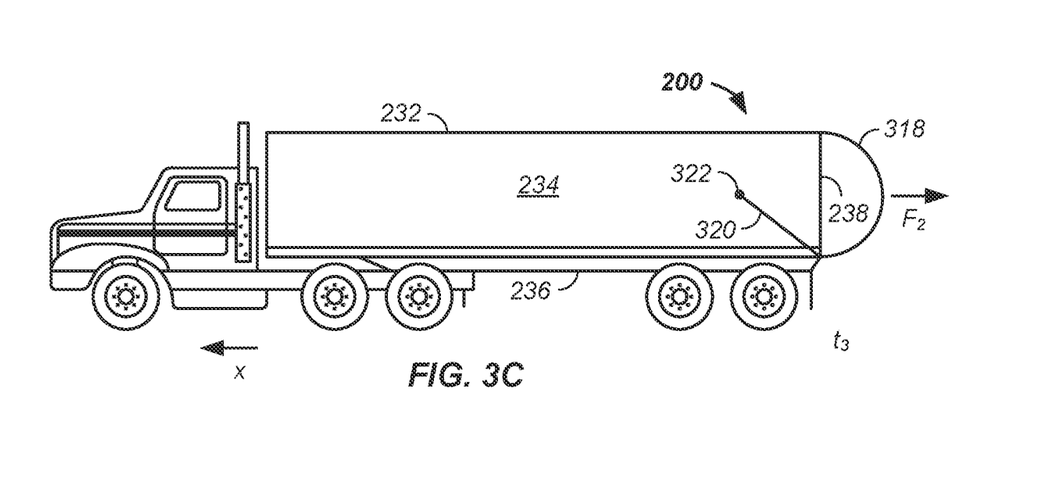

Referring now to FIG. 3A, FIG. 3B, and FIG. 3C, deployment 300 of a tail cone 310 is illustrated. Generally, the tail cone 310 is illustrated in a retracted form 312, in a partially deployed form 314, and in a totally deployed form 318 in FIGS. 3A-C, respectively. Referring now to FIG. 3A, a first example of a tail cone deployment system is illustrated, which uses a first deployment arm 320 attached to a pivot 322, and optionally a second pivot on the other side of the semi-truck 210. As illustrated in FIGS. 3A, 3B, and 3C, as the first deployment arm 320 pivots downward, about the pivot 322, the tail cone 310, which is connected to the first deployment arm 320, is unrolled, unpacked, and/or unfolded downward. As further described, infra, the forward motion of the semi-truck 210 and at least one opening at/near the forward edge of the tail cone 310 results in an air movement, air pressure, and/or air force that inflates the tail cone 310, such as at speeds in excess of 10, 20, 30, 40, or 50 miles per hour. The inflated tail cone is optionally referred to as a ram air inflated tail cone. Referring now to FIG. 3A and FIG. 3C, an initial force, $F_1$, is reduced to a deployed air-cone force, $F_2$, where the deployed air-cone force is about thirty percent less than the initial force at the same speed, where the reduction of force is speed dependent, as further described infra. Notably, the first deployment arm 320, pivoting about the pivot 322, used to uncoil the tail cone 310 is just an example of any system used to deploy the air-cone behind the vehicle 110.

Referring again to FIG. 3A and FIG. 3C, the tail cone 310 is optionally and preferably a flexible material, stored in a rolled, coiled, deployable, and/or folded shape, which expands into a cone when inflated by forced air, such as when the semi-truck 210 is moving. Generally, the flexible material of the tail cone 310 is any cloth, cotton, canvas, silk, rayon, Dacron, Kevlar, nylon, ripstop, parachute, or synthetic material. Generally, airflow through the material is substantially less than around the material. In practice, air initially rushes into the tail cone 310, which pressurizes the tail cone 310. Once sufficient pressure is in the tail cone 310, the pressure within the tail cone 310 substantially reduces "new" air flowing into the tail cone 310, which then causes the tail cone 310 to stop acting like a parachute and start performing as a static aerodynamic feature. For instance, the aerodynamic feature has a static shape, much like an inflated balloon, tire, or blimp. Yet, the static feature is still compliant and/or flexible, such as, again, a balloon, tire, or blimp.

EXAMPLE II

Figures 4A, 4B:
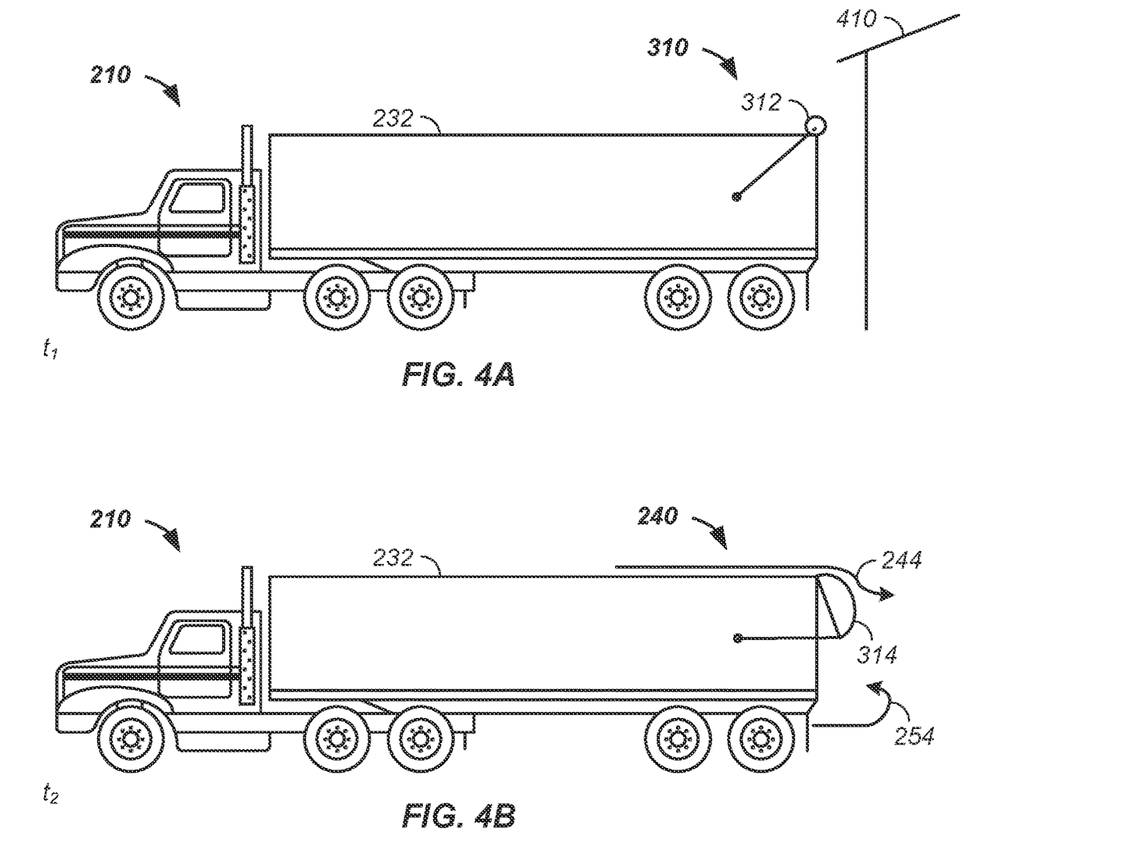
FIG. 4A, FIG. 4B, and FIG. 4C illustrate drag forces at a first, second, and third time, respectively.
Figure 4C:
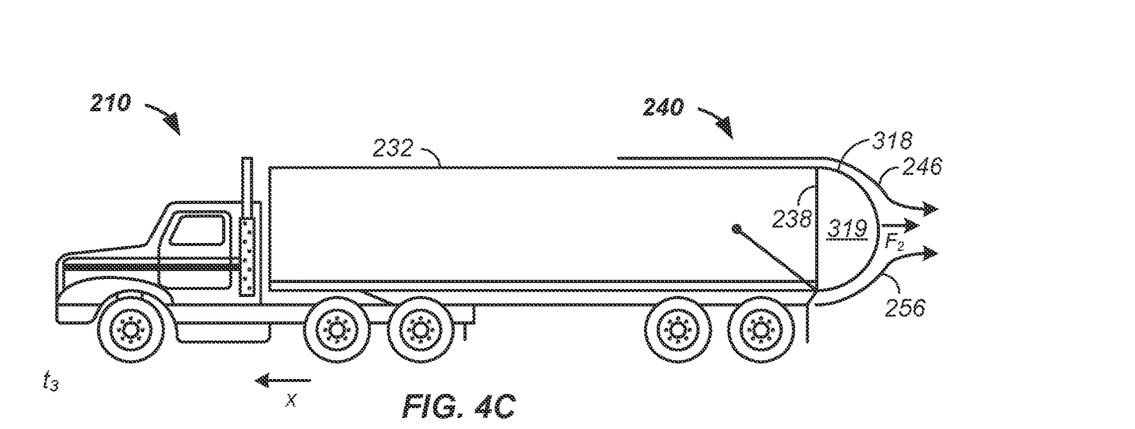

Referring now to FIGS. 4(A-C), a second example of deployment of the tail cone 310 is provided. In this example, referring now to FIG. 4A, the semi-truck 210 is illustrated in a parked state next to a building 410, such as by a loading dock. In the parked state, the tail cone 310 is optionally in a rolled up form, such as in a coil on the top of the semi-truck 230; off the end of the semi-truck; and/or behind an air shield, such as behind a top of the cab 220 of the truck. Alternatively, the undeployed tail cone could be on the side of the truck. However, optionally and preferably, the undeployed tail cone 310 is out of the way of the doors of the truck, lights of the truck, placards of the truck, and/or does not hinder people and/or equipment entering the truck. Referring now to FIG. 4B, as the semi-truck is picking up speed, the tail cone 310 starts to uncoil and/or inflate 314. This is optionally controlled electronically, such as through a motion or speed sensor and/or is controlled by an operator of the truck. Alternatively, the tail cone 310 starts to uncoil and/or inflate 314 when the semi-truck 210 achieves a speed, such as described supra. In one case, the tail cone 310 deploys at speeds greater than fifty miles per hour, such as when on a highway. Optionally, the tail cone 310 deploys when a GPS signal indicates that the semi-truck is on a highway or interstate with a speed limit above a threshold, such as above 50, 60, or 70 miles per hour (mph). Optionally, traffic information is used to control/limit deployment to stretches of road predicted to be free of obstacles and/or currently free of obstacles. Thus, the tail cone 310 is optionally deployed/recoiled based upon road construction, traffic congestion, and/or weather conditions. For instance, the rail cone is optionally not deployed in freezing rain conditions and/or heavy snow conditions.

Still referring to FIG. 4B and referring again to FIG. 2, once the tail cone 310 is in a partially deployed state 314, air flow above, below, and beside the truck alters. For example, the air flow along the top of the truck 242 alters from being pulled into a vacuum behind the truck to flowing past the air cone 244. Similarly, referring now to FIG. 4B and FIG. 4C, as the tail cone 310 goes from a partially deployed state 314 to a fully deployed state 318, the air flow above the truck 246, beside the truck (not illustrated), and below the truck 256 rejoins, such as in an extended cone pattern, about the tail cone 310, which results in less vacuum behind the truck, $F_2$.

EXAMPLE III

Figure 5:
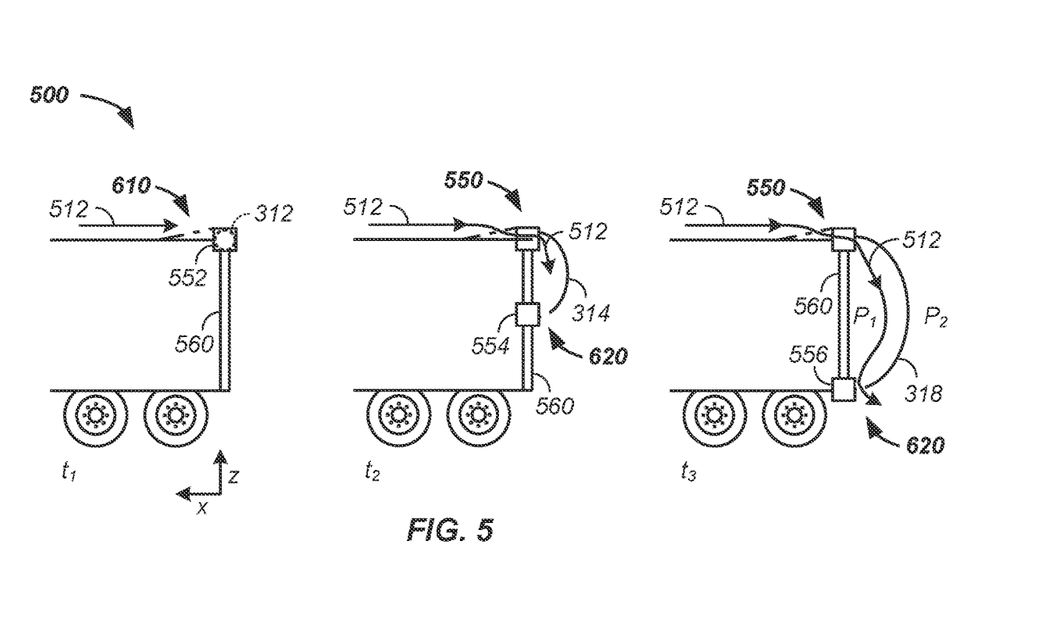
FIG. 5 illustrates a track/guide/rail tail cone deployment system.

Referring now to FIG. 5, a third example of deployment of the tail cone 310 is provided. In this example, a moveable forward attachment 550, which is attached to at least one leading edge of the tail cone 310 deploys along a rail/guide 560 attached to the semi-truck 210. As illustrated, the moveable forward attachment 550 deploys from an initial position 552 along a vertical rail, such as attached to the back of the semi-truck 210. As the moveable forward attachment 550 is moved down the rail to a partially deployed position 554, the forward (lower) edge of the tail cone 310 is deployed downward, such as to the intermediate deployment 314 position and then to a final position 556 corresponding to a position of final deployment 318 of the tail cone 310. Again, as above, the tail cone 310 inflates as it is deployed by air flow moving past the semi-truck 210 and into an interior space 319, as illustrated in FIG. 4C, contained by the tail cone 310. Notably, this is a second example of a mechanical system used to deploy the tail cone 310. The moveable forward attachment 554 is optionally deployed along any vector, such as across the back of the semi-truck 210.

EXAMPLE IV

Still referring to FIG. 5, air flow into the tail cone 310 is illustrated. In this example, as the tail cone 310 expands from an initial position 312, to a partially deployed position 314, to a full deployment position 318, air flows into the interior space 319 of the tail cone 310, the interior space illustrated in FIG. 4C. In this example, initial air 512, flowing along the back top of the semi-truck 210, flows through an optional aerodynamic lead opening 610 of the tail cone 310 in the initial position 312, into a leading edge/opening of the tail cone 310, and into the interior space 319 of the tail cone 310, which builds up an internal pressure, $P_1$, within the tail cone, where the internal pressure, $P_1$, is greater than an exterior air pressure, $P_2$, behind the semi-truck 210. For example, the internal pressure, $P_1$, optionally referred to as an internal stagnation pressure, exceeds 760 torr, such as being greater than 760, 770, 780, 790, 800, or 810 torr and the exterior air pressure, $P_2$, behind the semi-truck 210 is less than 760, 750, or 740 torr. Hence, the pressure inside the tail cone is optionally and preferably at least 1, 2, 3, 4, or 5 percent greater than behind the semi-truck 210. As illustrated, the lead opening 610 of the tail cone 310 is at a top of the tail cone 310, but the lead opening 610 is optionally positioned anywhere on the tail cone 310. As illustrated, a drain opening 620 allows water, fluid, ice, snow, debris, and/or hail that makes it into the interior space 319 of the tail cone to drain out of a bottom or near bottom section of the tail cone 310. Optionally and preferably, the drain opening 620 is smaller than the leading edge opening 610 to aid inflation of the tail cone 310 and the internal stagnation pressure of the tail cone 310 at operational speeds.

EXAMPLE V

Figure 6:
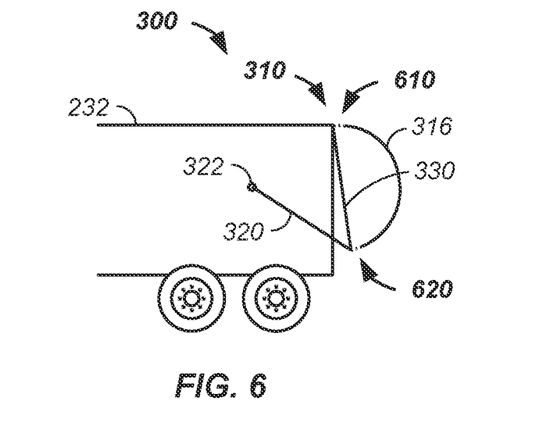
FIG. 6 illustrates a pivoting arm tail cone deployment system.

Referring now to FIG. 6, a fifth example of deployment 300 of the tail cone 310 is provided with a front edge 330 of the tail cone 310 displayed. The front edge 330 of the tail cone 310 is analogous to the bottom edge of a parachute canopy.

EXAMPLE VI

Figure 7:
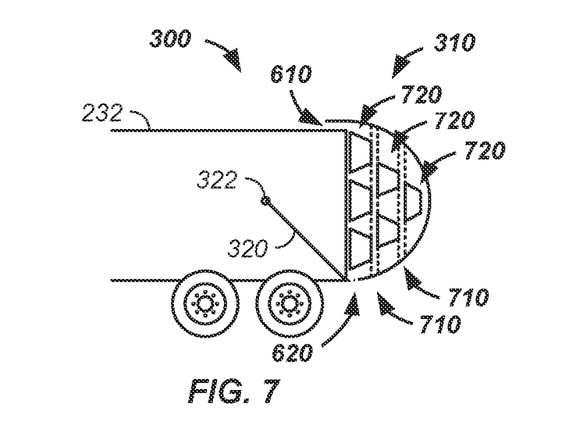
FIG. 7 illustrates a tail cone with ribs and cross bracing.
Figure 8:
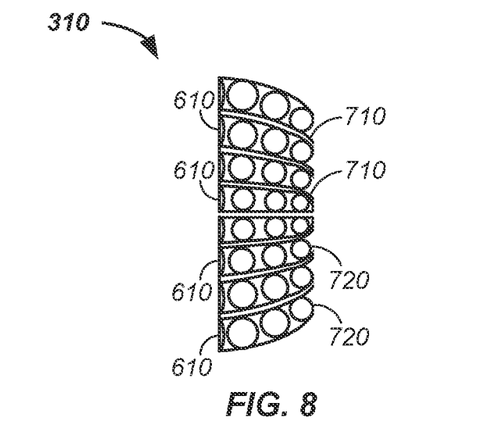
FIG. 8 illustrates a tail cone section with ribs and bracing.

Referring now to FIG. 7 and FIG. 8, a sixth example of deployment 300 of the tail cone 310 is provided. In this example, optional details of the tail cone 310 are illustrated. Particularly, the tail cone 310 is illustrated with optional ribs 710 and cross-bracings 720. The ribs 710 divide the tail cone 310 into cells, like cells of a parachute. Air enters openings 610, such as illustrated in FIG. 8, and enters or rams into the tail cone 310 to inflate ribs 710 of the tail cone 310. The cross-bracings 720 connect the ribs 710 and provide structural support to hold the inflated tail cone 310 into a desired shape, such as: a cone, a rounded cone, a rectangular based cone, a rectangular base/rounded top shape cone.

EXAMPLE VII

Figure 9:
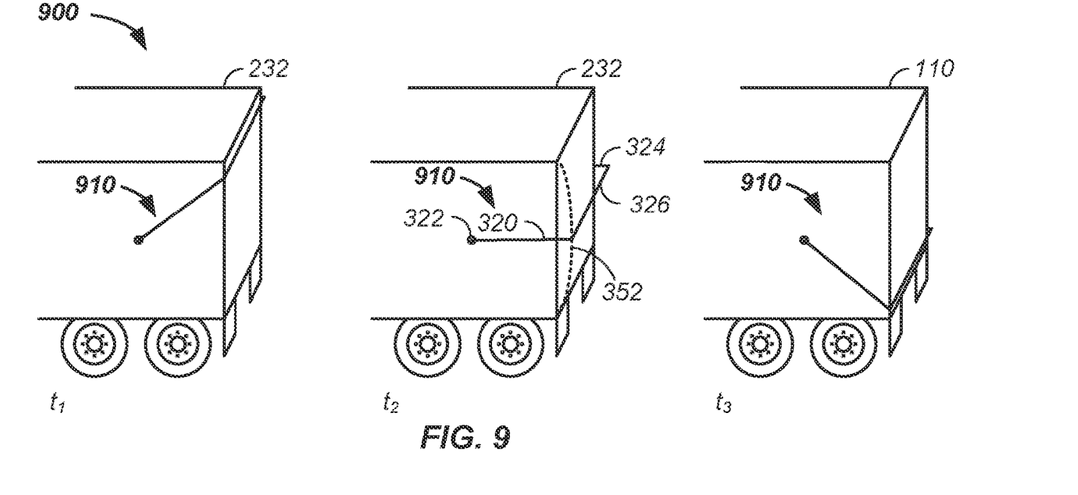
FIG. 9 illustrates a tail cone deployed along an arc.

Referring now to FIG. 9, a seventh example of deployment of the tail cone 900 is provided. In this example, a cross-bar deployment system 910 includes the first deployment arm 320 connected to a first side of the semi-truck 210 and a second deployment arm 324 connected to a different and preferably an opposite side of the semi-truck 210 with an optional cross-bar 326 connected to the first and second deployment arms 320, 324. As illustrated in this example, the deployment arms 320, 324 optionally travel along an arc 352, such as from a top 232 of the semi-truck 210 to a bottom 236 of the semi-truck 210. For example, means for deploying include a movable element attached to at least a portion of the tail cone, the movable element moveable from within one foot of a first side of the vehicle to within one foot of an opposite side of the vehicle and/or a step of deploying comprises the steps of: attaching at least a portion of the tail cone to a moveable element; and moving the movable element from within one foot of a first side of the vehicle to within one foot of an opposite side of the vehicle.

EXAMPLE VIII

Figure 10:
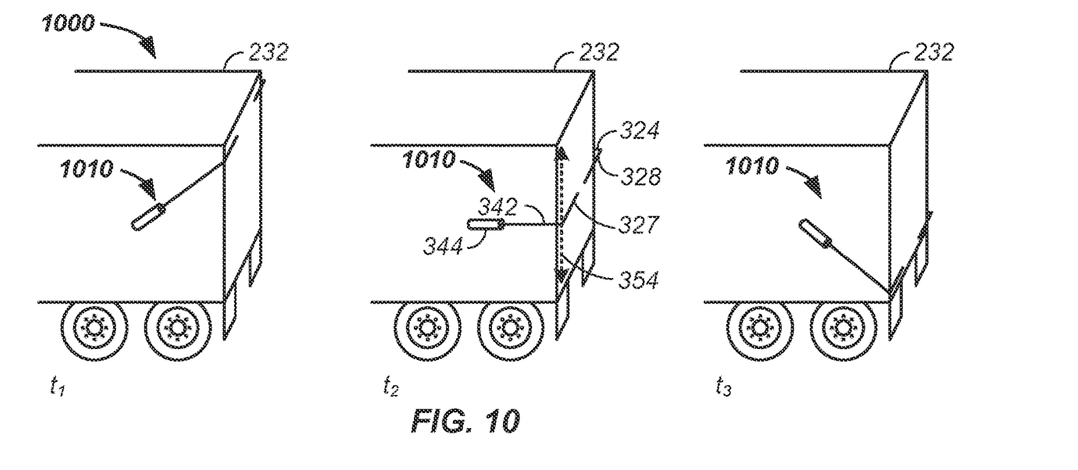
FIG. 10 illustrates a tail cone delivered along an edge of a semi-truck.

Referring now to FIG. 10, an eighth example of an extended tail cone system 1000 is provided. In this example, an extendable arm 1010 is used in deployment of the tail cone 310. Generally a first segment 342 of the extendable arm retracts into and/or by a second segment 344 of the extendable arm 344, where an alternating extension/retraction of the extendable arm 1010 is optionally driven by a motor and/or is under computer control. As illustrated at the second time, $t_2$, the extension/retraction of the extendable arm allows for any geometric length of the extendable arm 1010 as a function of deployment position. As illustrated, the extendable arm 1010 extends variably to achieve a linear track from the top 232 of the semi-truck 210 to the bottom 236 of the semi-truck. This example also illustrates an optional multi-part cross-bar, such as a left cross-member 327 and a right cross-member 328, which are optionally connected or not connected to one another.

EXAMPLE IX

Figure 11:
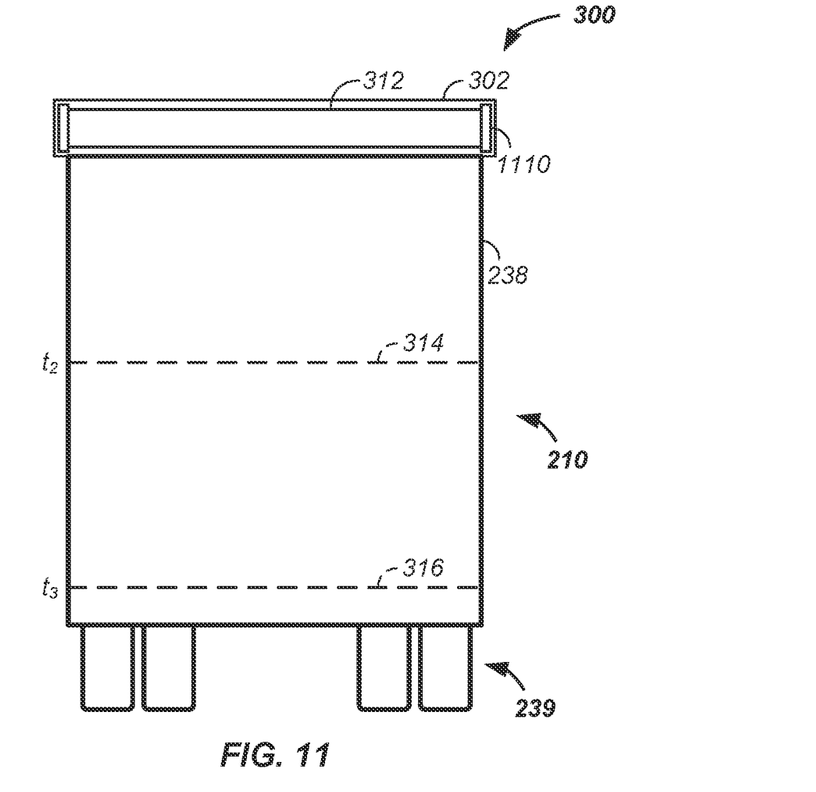
FIG. 11 illustrates a tail cone on a back of a truck.
Figure 12:
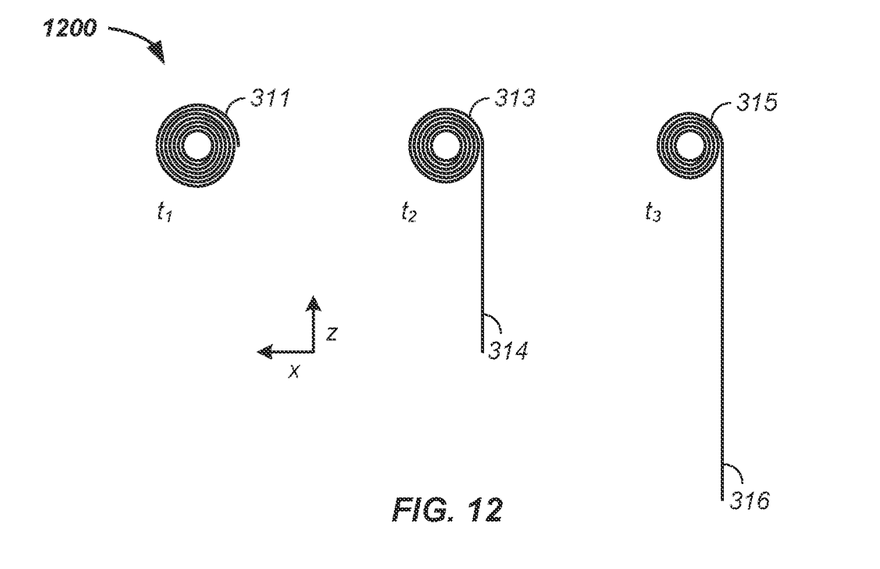
FIG. 12 illustrates unwinding a tail cone.

Referring now to FIG. 10 and FIG. 11, a ninth example of deployment 300 of the tail cone 310 is illustrated. Referring now to FIG. 11, the retracted form 312 of the tail cone 310 is illustrated in an optional housing 302. Air for deployment of the tail cone 310 optionally flows through the housing. Optionally a motor 1110, such as under computer control, is attached to a drive/axis holding the retracted form 312 of the tail cone 310. As illustrated, at a second time, $t_2$, the tail cone 310 is in a partially deployed position 314, and at a third time, $t_3$, the tail cone 310 is in a mostly deployed position 316. Referring now to FIG. 11, a coiler 1200 is illustrated in a fully wound position 311 at a first time, $t_1$; at a partially unwound position 313 corresponding to the partially deployed position 314 of the tail cone 310 at a second time, $t_2$; and at a mostly unwound position 315 corresponding to the mostly deployed position 316 at a third time, $t_3$. The tail cone 310 is optionally alternatingly deflated/inflated, wound/unwound, folded/unfolded, packed/deployed, and/or packed/unpacked between/during deployment times. Optionally, the motor is replace by a spring having a spring force that rolls up the tail cone 310 when air pressure is low, such as at low speeds of the semi-truck 210 and allows the tail cone 310 to deploy at higher pressures in the enclosed space 319, such at speeds of the semi-truck exceeding 30, 40, or 50 mph.

EXAMPLE X

Figures 13, 14:
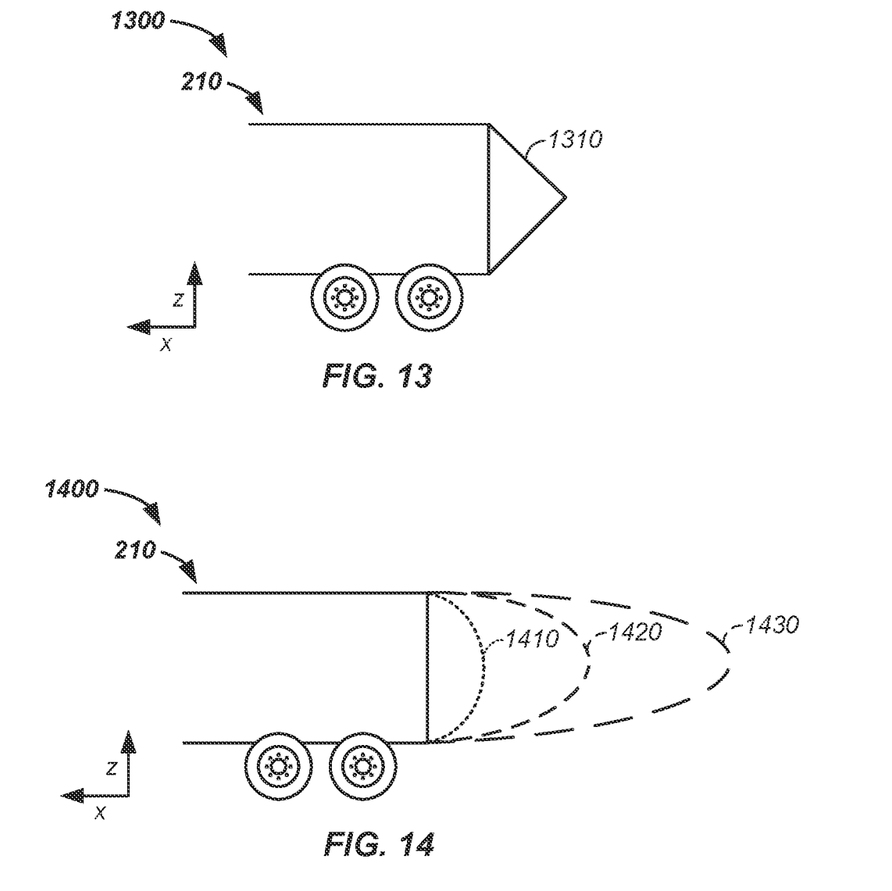
FIG. 13 illustrates a tail cone with a geometric shape.
FIG. 14 illustrates drag forces behind a truck without a tail cone.

Referring now to FIG. 13, a tenth example of deployment 300 of the tail cone 310 is illustrated in a geometric shape deployment system 1300. In the geometric shape deployment system 1300 the tail cone 310 is optionally deployed in any geometric shape. As illustrated, the tail cone 310 is deployed in a pyramidal shape 1310. One preferred shape is a tear drop shape. For instance, the bottom portion of a falling teardrop is the shape of the rear portion of the tail cone 310. Current United States Department of Transportation guidelines require that objects extend no more than five feet off of the back of a truck. Thus, a preferred extension of the tail cone 310 off of the back 238 of the semi-truck 210 is five feet or less. Optionally, the tail cone 310 extends greater than 1, 1.25, 1.5, 2, or 3 feet off of the back of the truck and less than 50, 25, 10, or 6 feet off of the back 238 of the semi-truck 210. Preferably, lights and placards are visible with and without deployment of the tail cone 310. Optionally, lights and/or placards are integrated into the tail cone 310.

Efficiency

Figure 15:
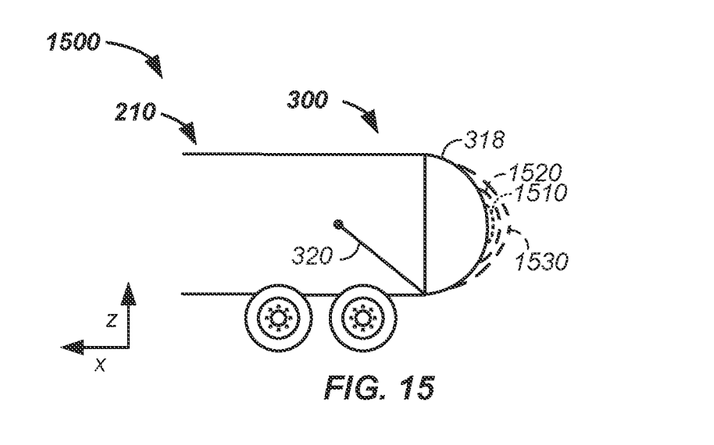
FIG. 15 illustrates reduced drag forces behind a tail cone.

Referring now to FIG. 14 and FIG. 15, drag forces with and without the tail cone 310 are compared. Referring now to FIG. 14, a semi-truck 210 without a tail cone 310 is illustrated. As illustrated, for an example at 55 mph, a large pressure drop 1410 occurs for several feet behind the semi-truck 210; a medium pressure drop 1420 occurs for ten or so feet behind the semi-truck 210; and a low pressure drop 1430 occurs at greater distances behind the semi-truck 210. Referring now to FIG. 15, the same pressure drops as in FIG. 14 are illustrated for the semi-truck 210, still at 55 mph, with a fully deployed 318 tail cone 310. Notably, the large, medium, and small tail cone pressure drops 1510, 1520, and 1530, respectively, cover a smaller cross-sectional area and extend to a shorter distance behind the semi-truck. Thus, the drag force on the semi-truck is less, as calculated from equations 1 and 2, supra, and as illustrated infra, in terms of miles per gallon.

Figure 16:
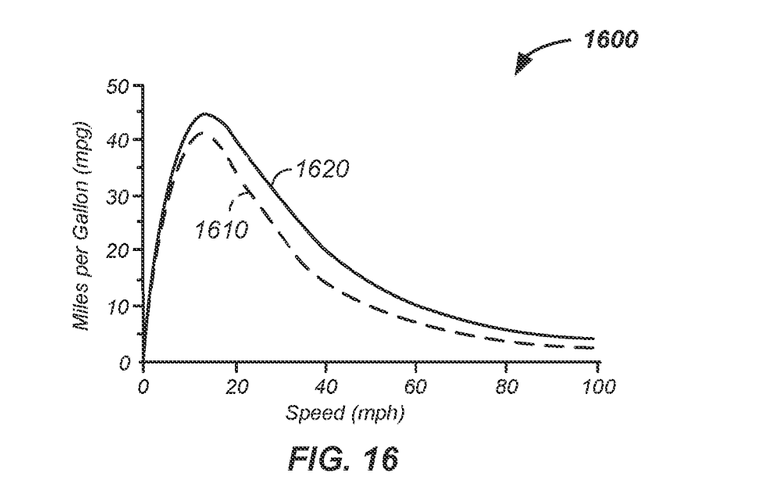
FIG. 16 illustrates increased miles per gallon with a tail cone.
Figure 17:
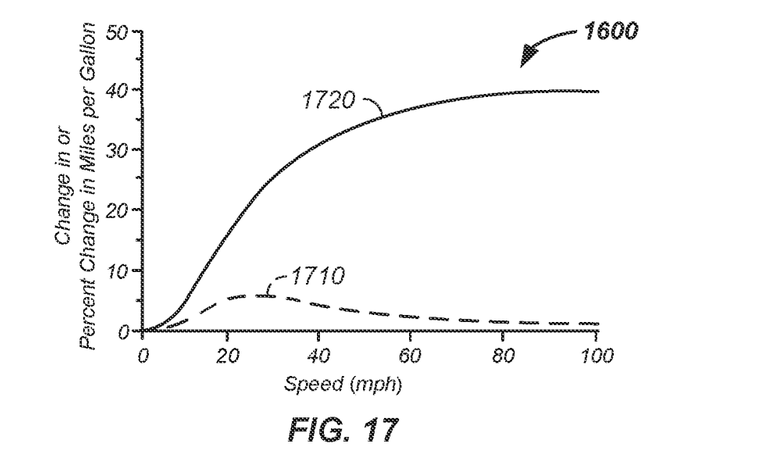
FIG. 17 illustrates changes in miles per gallon as a function of speed.

Referring now to FIG. 16, fuel efficiency 1600 is illustrated in terms of miles per gallon for a semi-truck 210 without a tail cone 1610 and a semi-truck 210 with a deployed tail cone 1620. At low speeds, such as less than 5 mph, rolling resistance dominates and fuel efficiency is comparable with and without a deployed tail cone 310. At higher speeds, the deployed tail cone 310 increases observed miles per gallon of the semi-truck 210. As illustrated in FIG. 17, the change in miles per gallon (mpg) 1710 with the deployed tail cone 310 increases to a speed of about 25 mph, where pressure drag dominates, and then slowly decreases, such as to 75 mph. However, the percent change in mpg 1720 increases dramatically from 10 to 40 mph and continues to increase up to 100 mph, which is consistent with equation 1, where drag force is proportional to velocity squared. Notably, at speeds in excess of 50 mph, the percent change in mpg is greater than 20 or 30 percent. Many billions of gallons of gas are used per year to fuel semi-trucks in the United States alone. Even at three dollars a gallon, this equate to $500 million in savings and 1.9 million tons of decreased carbon dioxide emissions per year per one billion gallons of gas used at 35 mph. Savings increase with speed and also increase with increased fuel prices.

Notably, the pliable inflatable shapes of the tail cone 310 are not subject to damage from vibrations resulting from hitting bumps and/or pot holes.

Optionally, the tail cone 310 is inflatable with a compressed air tank, where the air is optionally recovered into a tank.

Still yet another embodiment includes any combination and/or permutation of any of the elements described herein.

The main controller, a localized communication apparatus, and/or a system for communication of information optionally comprises one or more subsystems stored on a client. The client is a computing platform configured to act as a client device or other computing device, such as a computer, personal computer, a digital media device, and/or a personal digital assistant. The client comprises a processor that is optionally coupled to one or more internal or external input device, such as a mouse, a keyboard, a display device, a voice recognition system, a motion recognition system, or the like. The processor is also communicatively coupled to an output device, such as a display screen or data link to display or send data and/or processed information, respectively. In one embodiment, the communication apparatus is the processor. In another embodiment, the communication apparatus is a set of instructions stored in memory that is carried out by the processor.

The client includes a computer-readable storage medium, such as memory. The memory includes, but is not limited to, an electronic, optical, magnetic, or another storage or transmission data storage medium capable of coupling to a processor, such as a processor in communication with a touch-sensitive input device linked to computer-readable instructions. Other examples of suitable media include, for example, a flash drive, a CD-ROM, read only memory (ROM), random access memory (RAM), an application-specific integrated circuit (ASIC), a DVD, magnetic disk, an optical disk, and/or a memory chip. The processor executes a set of computer-executable program code instructions stored in the memory. The instructions may comprise code from any computer-programming language, including, for example, C originally of Bell Laboratories, C++, C #, Visual Basic® (Microsoft, Redmond, WA), Matlab® (MathWorks, Natick, MA), Java® (Oracle Corporation, Redwood City, CA), and JavaScript® (Oracle Corporation, Redwood City, CA).

Herein, any number, such as 1, 2, 3, 4, 5, is optionally more than the number, less than the number, or within 1, 2, 5, 10, 20, or 50 percent of the number.

Herein, an element and/or object is optionally manually and/or mechanically moved, such as along a guiding element, with a motor, and/or under control of the main controller.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for increasing fuel efficiency of a vehicle moving through air, comprising the steps of:
   carrying, by the vehicle, a tail cone in an undeployed state;
   deploying said tail cone, by a back of the vehicle, said tail cone comprising a flexible material, said step of deploying further comprising the steps of:
      attaching at least a portion of said tail cone to a moveable element; and
      moving said movable element from within one foot of a first side of the vehicle to within one foot of an opposite side of the vehicle; and
   pressurizing, with the air, an interior space at least partially enclosed by said tail cone, said tail cone forming an aerodynamic feature extending at least fifteen inches behind the vehicle.

2. The method of claim 1, said step of pressurizing further comprising the step of:
   transforming said tail cone from a flexible material to at least one of:
      a static and aerodynamic state of said tail cone;
      a static and compliant shape of said tail cone; and
      a static and flexible form of said tail cone.

3. The method of claim 1, further comprising the step of:
   increasing miles per gallon of the vehicle by at least ten percent at speeds in excess of fifty miles an hour through said steps of deploying and pressurizing said tail cone.

4. The method of claim 1, further comprising the step of:
   forming the tail cone into a geometric shape comprising at least part of at least one of:
      a teardrop shape;
      a rectangular based pyramidal shape;
      a rectangular based rounded top shape;
      a cone shape; and
      a rounded cone shape.

5. The method of claim 1, said step of pressurizing further comprising the step of:
   ramming air passing past the vehicle into a leading edge of said tail cone, said leading edge within five feet of a back of the vehicle.

6. The method of claim 5, said step of pressurizing further comprising the step of:
   pressurizing a set of at least three cells of said tail cone separated by a set of at least two ribs of said tail cone.

7. The method of claim 5, further comprising the step of:
   retracting, after said step of deploying, said tail cone back into said undeployed state.

8. The method of claim 7, said step of retracting further comprising the step of:
   rewinding said tail cone into said undeployed state.

9. The method of claim 1, further comprising the step of:
   alternatingly unwinding and winding, with a motor, said tail cone from said undeployed state to an aerodynamic enhancing deployed state.

10. The method of claim 1, further comprising the step of:
    reducing a drag force of the vehicle at a speed of at least fifty miles per hour by greater than ten percent through deployment of said tail cone.

11. The method of claim 1, further comprising the step of:
    increasing miles per gallon traveled by the vehicle at a speed of at least fifty miles per hour by greater than five percent through deployment of said tail cone.

12. An apparatus for increasing fuel efficiency of a vehicle moving through air, comprising:
    a tail cone configured to be carried, by the vehicle, in an undeployed state;
    means for deploying said tail cone on a back of the vehicle while the vehicle is in motion, said tail cone comprising a flexible material, said means for deploying comprising a movable element attached to at least a portion of said tail cone, said movable element moveable from within one foot of a first side of the vehicle to within one foot of an opposite side of the vehicle; and
    an interior space at least partially enclosed by said tail cone, said interior space pressurized by the air, said tail cone comprising an aerodynamic feature extending at least fifteen inches behind the vehicle.

13. The apparatus of claim 12, said means for deploying further comprising:
    a motor attached to said tail cone.

14. The apparatus of claim 12, further comprising:
    computer control of said means for deploying, said computer control responsive to global positioning system location information.

15. The apparatus of claim 12, said tail cone further comprising:
    a direction of travel leading edge opening allowing passage of the air into an internal space at least partially enclosed by said tail cone.

16. The apparatus of claim 15, said tail cone further comprising:
    a set of at least three cells separated by at least two ribs, said cells inflatable by the air when the vehicle is moving in excess of twenty miles per hour.

* * * * *